UNITED STATES PATENT OFFICE.

RICHARD K. MEADE, OF ROLAND PARK, MARYLAND.

WATERPROOF CONCRETE AND PROCESS OF MAKING THE SAME.

1,092,933. Specification of Letters Patent. Patented Apr. 14, 1914.
No Drawing. Application filed February 10, 1912. Serial No. 676,754.

*To all whom it may concern:*

Be it known that I, RICHARD K. MEADE, a citizen of the United States, residing at Roland Park, in the county of Baltimore and State of Maryland, have invented certain new and useful Improvements in Waterproof Concrete and Processes of Making the Same, of which the following is a specification.

This invention relates to water-proof concrete, cement mortar, artificial stone and the like and has particular reference to an improved method of imparting water-proofing qualities to cement so that such cement when made into concrete or the like will be impervious to water.

Heretofore, many attempts have been made to render concrete water-proof by mixing therewith various oils and various combinations of fats, oils and waxes with alkaline earth and other metals, such for example as calcium oleate or stearate, but such combinations have not been wholly satisfactory.

I have discovered that permanently waterproof concrete can be produced by adding to the cement a powdered filler, the particles of which are coated with a thin coating or film of oil, preferably a mineral oil, such for example, as kerosene or other oil comprising one or more members of the paraffin series, or melted paraffin.

The filler may be any finely powdered substance which will not attack or disintegrate the concrete, such for example as hydrated lime, clay, powdered shale or the like.

The particles of the filler may be provided with a film of oil in any suitable manner, as by prolonged mixing or rubbing the oil and filler together.

The quantity of oil employed is such that no oil will be apparent in the concrete, the oil being present in the form of an extremely thin coating or film on the particles of the filler, such coating or film being preferably so thin that the filler will not be rendered noticeably plastic or sticky thereby.

The amount of oil required to provide a film on the particles of the filler, as hereinbefore described, depends upon the fineness of such particles and consequently upon the surface exposed thereby. In the case of hydrated lime, the particles of which are extremely minute, I prefer to employ from 30 to 50 per cent. by weight of oil.

The filler is added to the cement in any desired proportion, the best results being ordinarily obtained by the addition of from 5 to 10 per cent. of the filler.

It is to be understood that I do not claim to be the first to produce concrete having an oil, fat, wax or the like incorporated therein, my invention consisting in the addition to cement of a filler made up of minute particles coated with a film of oleaginous matter, preferably a mineral oil, such for example, as kerosene or other oil comprising one or more members of the paraffin series.

While I have described in detail the specific reagents which I prefer to employ and the proportions in which I prefer to mix them, it is to be understood that chemical equivalents may be employed and that the proportions may be widely varied without departing from the spirit of my invention or the scope of the subjoined claims.

Having thus described my invention, I claim:—

1. The process of rendering concrete water-proof, which consists in mixing therewith a powdered filler, the particles of which are coated with an oleaginous film, such film being so thin that the filler is not rendered noticeably plastic or sticky thereby.

2. The process of rendering concrete water-proof, which consists in mixing therewith a powdered filler, the particles of which are coated with a thin film of mineral oil, the film being so thin that the filler is not rendered noticeably plastic or sticky thereby.

3. The herein described concrete composition comprising cementitious material and a powdered filler, the particles of which are provided with an oleaginous film, such film being so thin that the filler is not rendered noticeably plastic or sticky thereby.

4. The herein described concrete composition comprising cementitious material and a filler made up of small particles coated with a film of mineral oil, the film being so thin that the filler is not rendered noticeably plastic or sticky thereby.

In testimony whereof I affix my signature in presence of two witnesses.

RICHARD K. MEADE.

Witnesses:
W. M. REICHE,
HELEN C. MOHR.

Copies of this patent may be obtained for five cents each, by addressing the "Commissioner of Patents, Washington, D. C."